June 11, 1968 G. R. WILKIN 3,387,720
STACKING MACHINE
Filed June 14, 1965 4 Sheets-Sheet 3
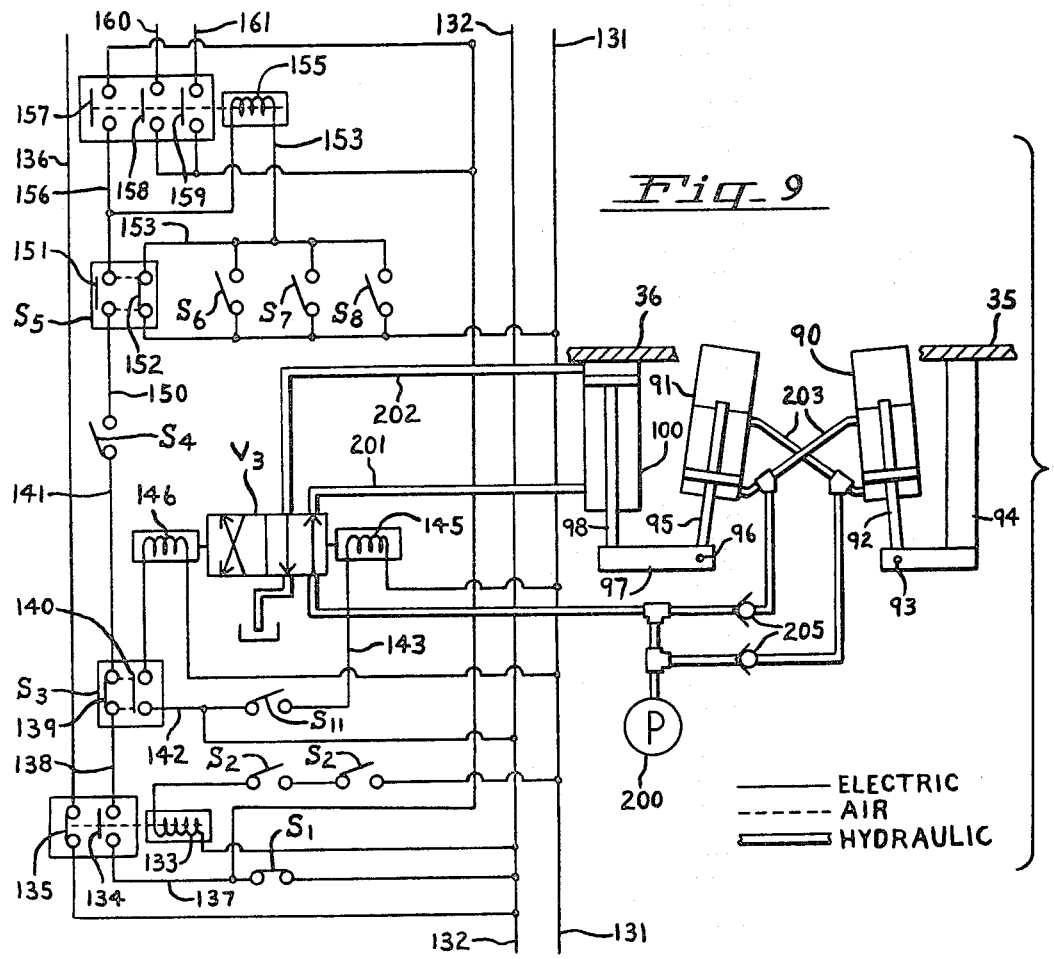
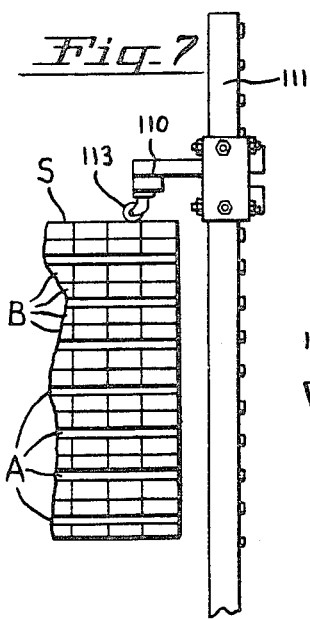
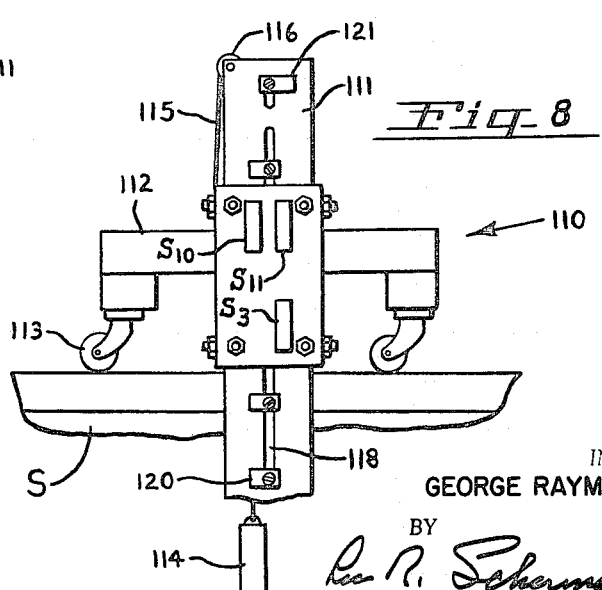
INVENTOR.
GEORGE RAYMOND WILKIN

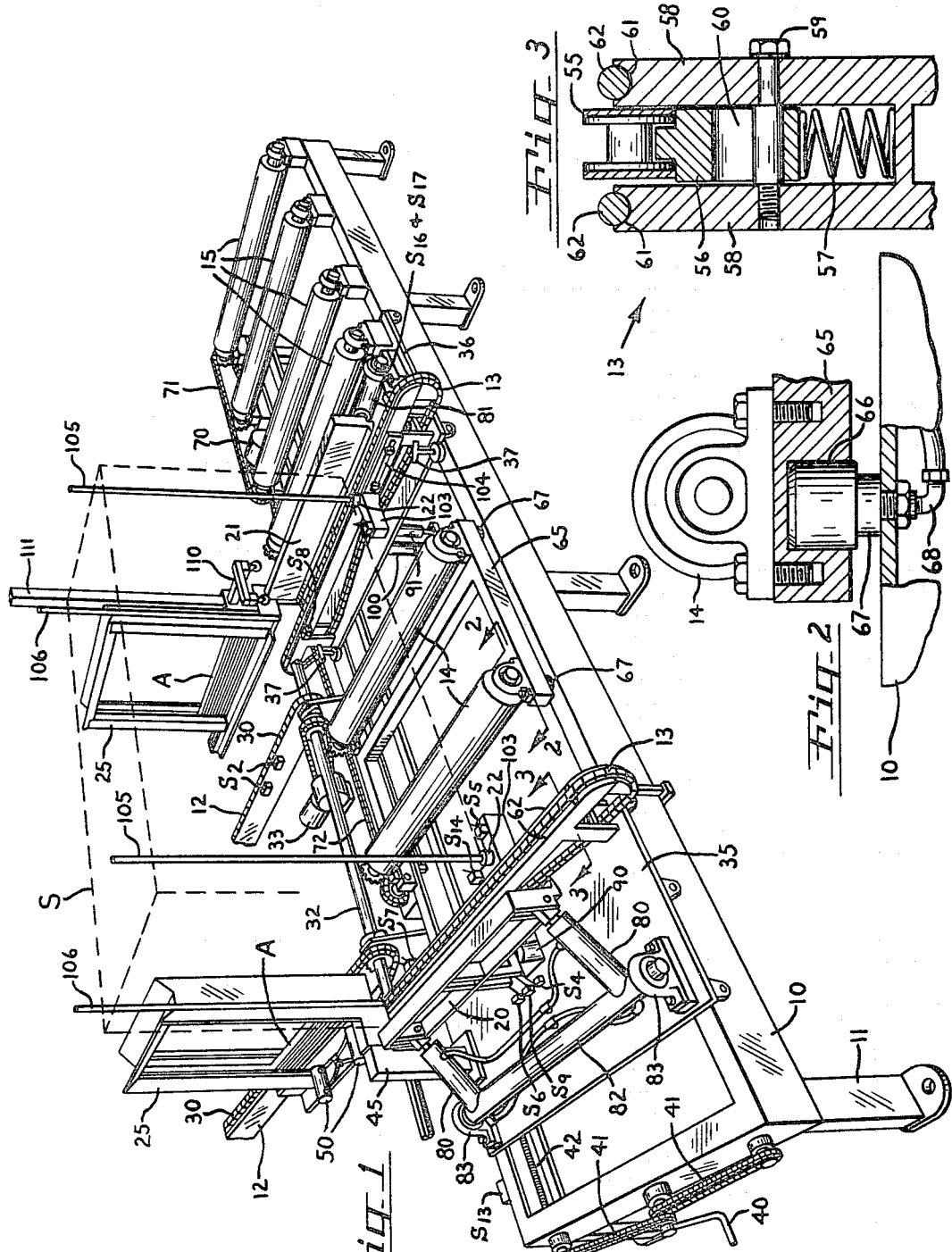

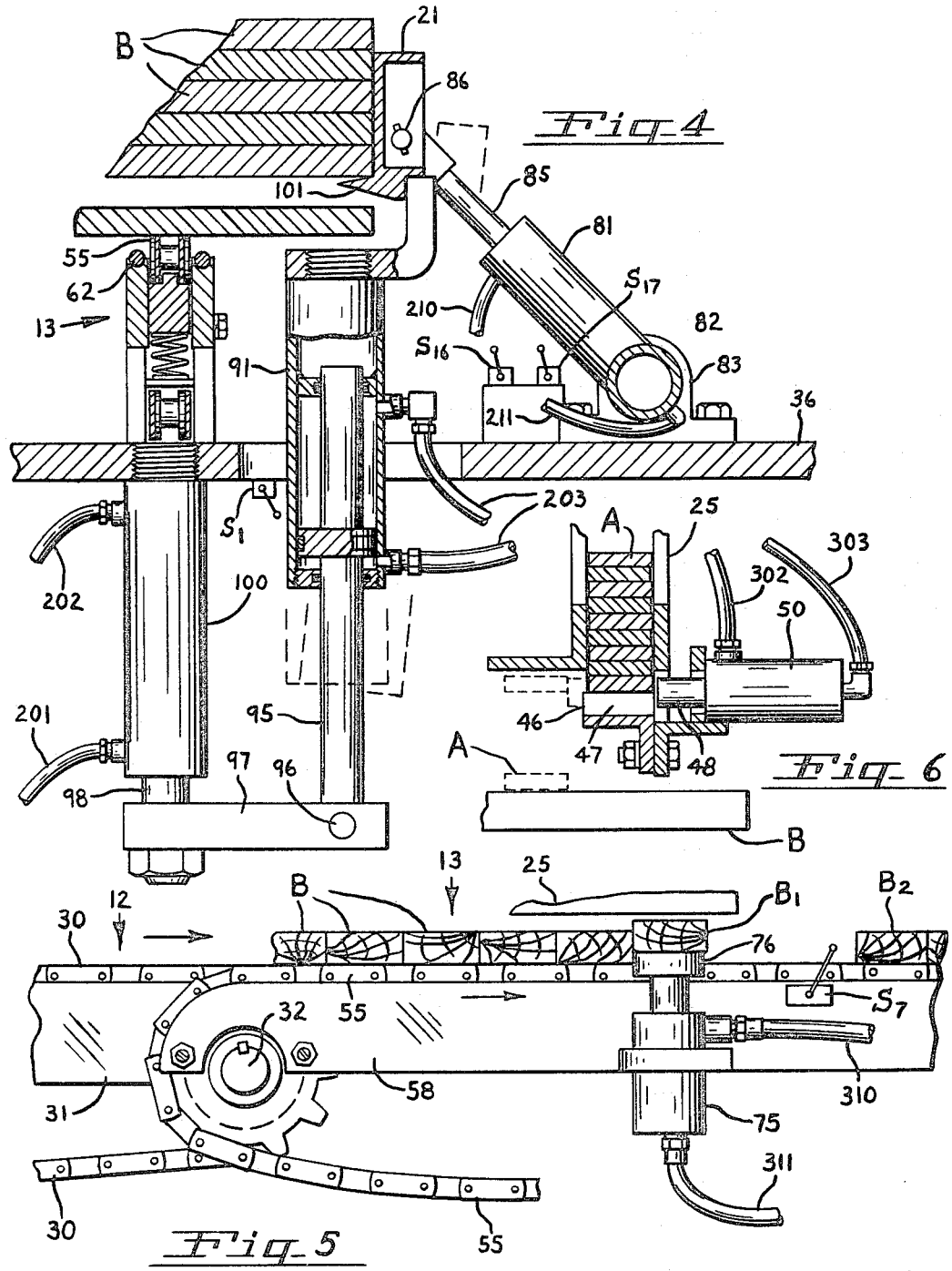

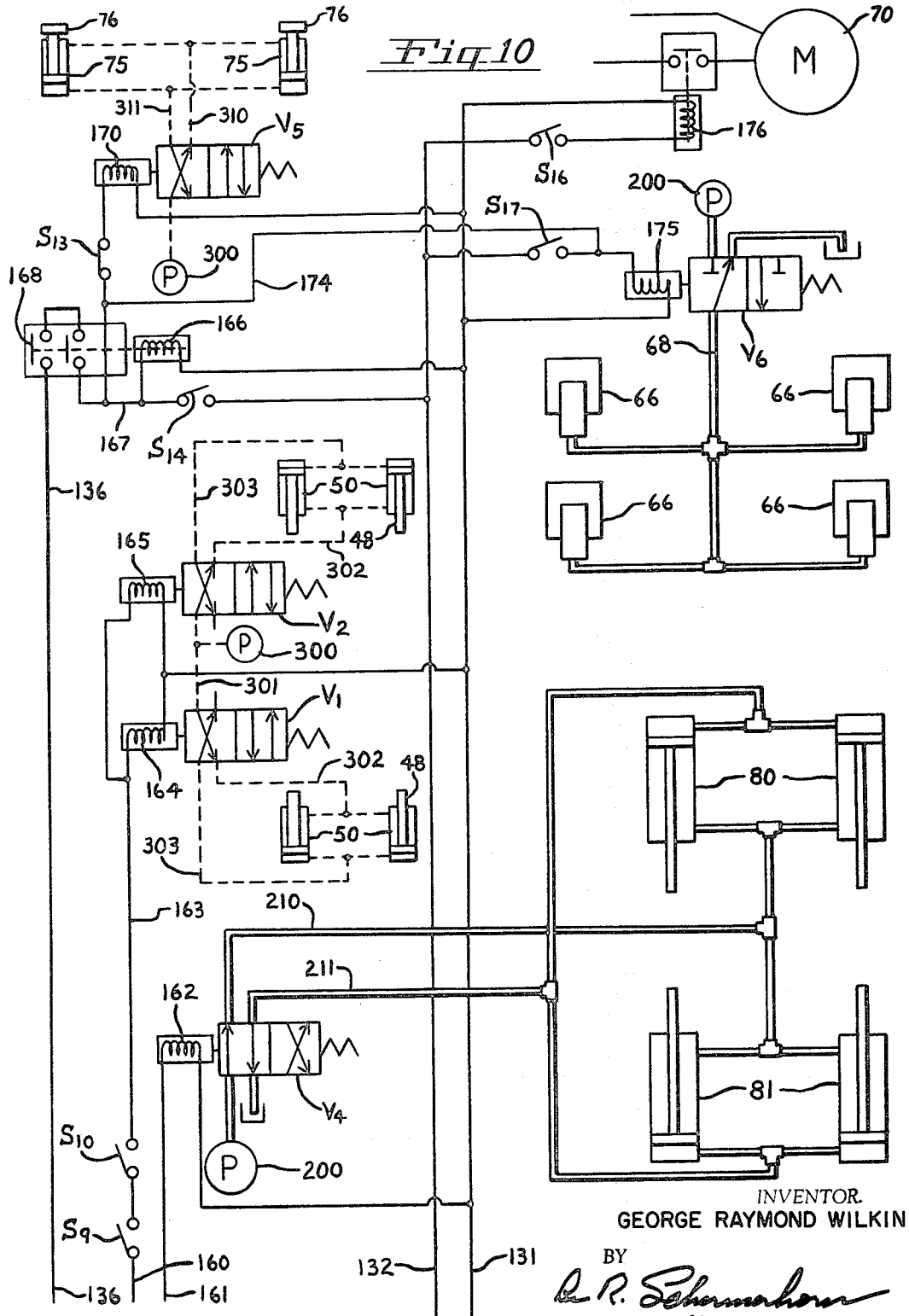

United States Patent Office 3,387,720
Patented June 11, 1968

3,387,720
STACKING MACHINE
George Raymond Wilkin, 8235 N. Kerby Ave.,
Portland, Oreg. 97217
Filed June 14, 1965, Ser. No. 463,524
27 Claims. (Cl. 214—6)

ABSTRACT OF THE DISCLOSURE

An entirely automated stacking machine for lumber and other articles having means for building a stack from the bottom on an infeed conveyor, means for measuring the height of the stack and a transverse off-bearing conveyor for removing the completed stack.

This invention relates to apparatus for building a stack of articles from the bottom. The principles of the invention may be employed for stacking various kinds of flat articles, such as boxes, pallets, trays and the like. The invention is of particular advantage, however, in stacking tiers of lumber and, by way of example, a machine for stacking two by four inch studs will be illustrated and described.

The general object of the invention is to provide improved apparatus for building a stack of articles from the bottom. More particular objects are to provide a stacking machine having no change is elevation from infeed to outfeed, to provide a stacking machine which may be easily adjusted to different sizes of articles or packages, to provide a stacking machine which is economical of floor space, to provide a stacking machine of relatively simple and rugged construction which is reliable and trouble free in operation, to provide a stacking machine in which the completed stack may be removed in any one of three different directions, to provide a stacking machine in which separator sticks may be placed between layers of articles at intervals in the stack as desired, to provide a lumber stacker which will even the ends of the boards, to provide a stacking machine of the type described for fully automatic operation, and to provide an improved control system for the stacking mechanism.

The objects of the invention are attained primarily by the use of a novel arrangement of lifting and evening platens which lift the stack at intervals to allow for the addition of another tier under the stack. Each time the stack is lifted, the newly introduced tier is included and the ends are evened with the tiers above. In stacking lumber it is often desired to insert separator sticks at intervals in the stack between the tiers of boards and the present machine includes stick dropping mechanisms for this purpose.

The stack may be built up to any height desired and the completed stack may be discharged straight forward from the machine in the direction of its infeed conveyor or it may be discharged laterally either to the right or to the left to suit the space available at the place of installation. In any case, the stack is discharged on the same level as the infeed conveyor which is usually most convenient for the user of the equipment. There are also other important features of novelty including an automatic control system which eliminates the necessity of having an operator continuously present to initiate the many machine functions in proper sequence.

The invention will be better understood and additional objects and advantages will become apparent from the following description of the preferred embodiment illustrated in the accompanying drawings. Various changes may be made in the details of construction and arrangement of parts and certain features may be used without others. All such modifications within the scope of the appended claims are included in the invention.

In the drawings:

FIGURE 1 is a perspective view of a stacking machine embodying the principles of the invention;

FIGURE 2 is an enlarged view taken on the line 2—2 in FIGURE 1;

FIGURE 3 is an enlarged view taken on the line 3—3 in FIGURE 1;

FIGURE 4 is a fragmentary view with parts in section, showing one of the platen mechanisms;

FIGURE 5 is an elevation view of a portion of the infeed conveyors;

FIGURE 6 is a fragmentary sectional view of a stick dropper;

FIGURE 7 is a fragmentary side elevation view of a control switch monkey;

FIGURE 8 is a rear elevation view of the monkey in FIGURE 7;

FIGURE 9 is a diagram of a portion of the electric, hydraulic and pneumatic control circuits for the machine; and FIGURE 10 contains the rest of the control system shown in FIGURE 9.

GENERAL DESCRIPTION

As previously mentioned, the machine illustrated in the drawings is proportioned and arranged for stacking tiers of lumber, specifically two by four inch studs, it usually being desired to build a stack of suitable width and height for transportation by a factory lift truck or the like. It may be desired to band the stack for shipment as a unit load or it may be desired merely to remove the stack to some other plant operation such as a dry kiln. For convenience in subsequent handling of the stacks, the main frame 10 of the machine in FIGURE 1 is preferably supported above the floor on legs 11 on a level with horizontal infeed conveyor 12 which may be designated as the primary infeed conveyor. The lumber must be of at least approximately uniform length and preferably it is fed through an end trimmer in a preliminarily operation to make the length truly uniform. In such case, the lumber leaves the end trimmer and enters the machine in edgewise movement on conveyor 12 in a direction approaching the viewer in FIGURE 1.

Infeed conveyor 12 delivers a horizontal layer or tier of boards onto a secondary infeed conveyor 13 which has endless chains extending parallel with two series of off-bearing rollers 14 and 15. A pair of lifting and evening platens 20 and 21 are disposed on opposite sides of the chains of secondary infeed conveyor 13. When a first tier of boards has advanced into engagement with bumper stops 22, that tier is lifted a short distance by the platens 20 and 21 to provide clearance underneath for feeding a second tier of boards against the bumper stops 22. Then the platens 20 and 21 lower the first tier on top of the second tier, retract laterally and engage the second tier. The next lifting movement of the platens raises both tiers together to permit a third tier to pass underneath and then the platen cycle is repeated until the desired number of tiers have been assembled in a stack.

As previously mentioned, the completed stack may be discharged straight forward or laterally to the left or right. By way of illustration, the present machine is arranged to discharge to the right on offbearing rollers 14 and 15.

Also, as previously mentioned, in stacking lumber, it is often desired to insert separator sticks between all adjacent tiers of the boards or at intervals in the height of the stack for air circulation or other purposes. If the stack is of the usual height to make a normal load, and is not immediately banded, such separator sticks are necessary at intervals to tie the stack together and stabilize it, particularly in the case of relatively narrow boards such as two by four inch studs. For this purpose, the machine includes stick droppers 25. As many stick droppers may be used as desired, two being illustrated in FIGURE 1. As a layer of boards moves forward on infeed conveyors 12 and 13, these devices drop separator sticks on top of the boards in transverse relation to span the cracks between adjacent boards and frictionally tie the stack S together at intervals in a transverse direction. The foregoing describes the principal features and general mode of operation of the machine.

DETAILED DESCRIPTION

Infeed conveyor 12 comprises a pair of smooth chains 30 without lugs which ride on the upper edges of bars 31 as shown in FIGURE 5. These chains are driven by sprocket wheels on a drive shaft 32 which is driven continuously by the motor 33 in FIGURE 1.

The secondary infeed conveyor 13 also comprises a pair of smooth chains without lugs, these chains being driven continuously by sprocket wheels having sliding splined connection with drive shaft 32. In FIGURE 1, the left chain of conveyor 13, the platen 20 and the left stick dropper 25 are mounted on an adjustable base plate 35 on the frame 10 and the right-hand chain of conveyor 13, platen 21 and the right stick dropped 25 are mounted on an adjustable base plate 36.

Base plate 36 is slidable longitudinally on frame 10 and is secured in adjusted position by screw pins 37 which are received in holes spaced apart at one foot intervals in the horizontal rails of frame 10. Base plate 35 has a gradual adjustment for moving it and securing it precisely at a desired distance from base plate 36. The latter adjustment comprises a hand crank 40 having sprocket wheels and chains 41 for rotating a pair of shafts 42 extending along on opposite sides of frame 10. These shafts have threaded engagement with nuts on the under side of base plate 35. A similar gradual adjustment may be provided for the base plate 36, if desired. The adjustment means just described permits the secondary conveyor chains, platens and stick droppers to be moved toward and away from each other in accordance with the length of the boards to be stacked.

Stick droppers 25 are mounted on brackets 45 on the respective base plates 35 and 36 so as to extend in a position over the boards on the conveyor chains. Each stick dropper comprises a vertical, rectangular magazine frame to support a stack of the separator sticks.

Each stick dropper 25 has a stick ejector as shown in FIGURE 6. The stack of sticks A in the stick magazine is supported by a bottom plate 46 which has a slot or gap at 47 to receive a plunger 48 in a double acting air cylinder 50. The plunger is normally retracted as shown in full lines, allowing the bottom stick to rest on plate 46. When the plunger is actuated to the left as shown in broken lines, it pushes the bottom stick out through the open left side of the magazine causing it to drop on top of the boards B on the conveyor chains. There are two of the plungers 48 and cylinders 50 in the bottom of each stick dropper. While only two stick droppers are shown, additional stick droppers may be mounted in positions between the present stick droppers, if desired.

Secondary infeed conveyor 13 has a special form of construction as shown in FIGURE 3. Smooth conveyor chains 55 without lugs travel on track bars 56 which are resiliently supported on springs 57 between a pair of vertical plates 58. The vertical movement of each track bar 56 is limited by a bolt 59 which extends through a vertical slot 60 in the track bar as shown. The upper edges of plates 58 have semicircular grooves 61 to seat cylindrical rollers 62. The springs 57 will support a single layer of boards on chains 55 above and out of contact with the the rollers 62 as shown in FIGURE 4 but, when the weight of several layers is imposed on the chains 55, the chains are depressed allowing the bottom layer of boards to be supported primarily by the rollers. This arrangement facilitates the off-bearing movement of the stack to the right or left transversely of the chains.

Off-bearing rolls 14 are jump rolls mounted for vertical movement. These rolls are mounted on a frame 65 which is supported on four inverted hydraulic cylinders 66 as shown in FIGURE 2. These cylinders have pistons 67 mounted on frame 10 and equipped with hydraulic connections 68. When hydraulic pressure is relieved from the cylinder and piston units, frame 65 rests on frame 10 with rolls 14 below the level of rollers 62 placing the rolls 14 in position to support intermediate portions of the boards if they should tend to sag between the chains of conveyor 13. When hydraulic pressure is applied to the cylinder and piston units, the rolls 14 are raised up to be on a level with rollers 62 so that rolls 14 will have tractive engagement with the bottom layer of boards for off-bearing movement of a stack when the rolls are rotated.

The rolls 14 and 15 are rotated for off-bearing movement of the stack by a motor 70. This motor drives rolls 15 through chains 71 and drives rolls 14 through a chain 72.

Mounted on each chain assembly of secondary infeed conveyor 13 near its entrance end is a vertical pneumatic board stop cylinder 75 as shown in FIGURE 5. These cylinders have vertically movable pistons with board stops 76 arranged to rise under a particular board $B_1$ and hold back the incoming boards when sufficient boards to make a full tier have passed the stops. These board stops are under portions of the stick dropper frames 25 so that the lifted board $B_1$ will not be displaced from its place in the layer of boards by the rapid rising of the board stops. Stops 76 do not clamp the lifted board against the frames 25, however. Another important function of stops 76 is to provide alignment abutments to square off the oncoming boards perpendicular to chains 55 as the chains crowd the boards against the stops.

When a full tier of boards has accumulated on conveyor 13, the tier is lifted above the conveyor chains 55 by the platens 20 and 21. For this purpose a pair of platen cylinders 80 actuate the platen 20 and a pair of platen cylinders 81 actuate the platen 21. These cylinders are fixedly connected at their lower ends with shafts 82 mounted for rotation in bearing blocks 83 on the respective base plates 35 and 36 as shown in FIGURE 1. Each of these cylinders has a piston rod 85 pivotally connected with its platen at 86 as shown in FIGURE 4 in the case of platen 21.

Mounted on the under side of the platens is a pair of vertical equalizer cylinders 90 and 91, which are hydraulically cross connected as will be presently explained to make both platens move up and down in unison. Cylinder 90 is mounted at the center of platen 20 and cylinder 91 is mounted at the center of platen 21. As shown in FIGURE 9, the cylinder 90 has a piston rod 92 which is pivotally connected at 93 with a bracket 94 fixedly mounted on the under side of base plate 35. It will be observed that the platen 20 does not have to be depressed below the level of the stack for off-bearing movement.

On the other hand, for transverse off-bearing, the platen 21 does have to be depressed below the bottom of the stack for off-bearing movement and mechanism for this purpose is illustrated in FIGURE 4. In this case the piston rod 95 in cylinder 91 is pivotally connected at 96 with a bracket 97 which is fixedly connected to the lower end of a piston rod 98 in a vertical cylinder 100. Cylinder 100 is fixedly mounted on the under side of base plate 36.

The operation of the platens will now be described. When a full tier of boards has moved onto the conveyor 13, board stops 76 rise as shown in FIGURE 5 to lift the board $B_1$ just behind board $B_2$ which is the last board in the tier. The tier continues to move forward a short distance away from stops 76 as shown in FIGURE 5, the forward movement being arrested by bumper stops 22 in FIGURE 1. Then the extended piston rods 85 of both platens retract, swinging the platens away from each other and lowering them. FIGURE 4 illustrates in broken lines the swinging and lowering movement of platen 21 wherein it swings outward on pivot 96 and lowers on piston rod 95. Similar action occurs in FIGURE 9 where the platen 20 on cylinder 90 swings outward on pivot 93 and lowers on piston rod 92. The hydraulic cross connections between equalizing cylinders 90 and 91 coordinate the vertical movements of the two platens so that they swing out and down in unison.

Each platen is equipped with a wedge-shaped bottom lifting flange 101 extending the length of the platen. In the lowered position of the platens this lifting flange is on a slightly lower level than the tier of boards which is waiting on conveyor 13. When all four piston rods 85 are extended, the initial movement pivots the platens toward each other on their pivots 93 and 96 bringing the flanges 101 under the ends of the boards which overhang the conveyor chains 55 and the platens exert a squeezing action to even the ends of the boards. When the boards prevent further pivotal movement of the platens toward each other, the inclined positions of the piston rods cause the platens to rise and lift the tier of boards off the chains 55. This upper position of platen 21 is shown in full lines in FIGURE 4.

With the first tier of boards thus held in elevated position, the board stops 76 in FIGURE 5 retract, allowing a second tier to advance on the chains 55 of conveyor 13. In this movement, board $B_1$ becomes the leading board of the second tier. Then board stops 76 rise again and the platens return to pick up the new tier.

This time as the piston rods 85 retract, the weight of the tier of boards on lifting flanges 101 causes the initial movement of the platens to be downward rather than outward and the under sides of these flanges come into contact with the upper surface of the new tier of boards on chains 55. It will be observed that the platen pivots 86 form the apex of a triangle in FIGURE 4 of variable shape which has two variable length legs. One leg, cylinder 81 and piston rod 85, represents an independent variable controlled by hydraulic actuating pressure in the cylinder. The other leg, which is cylinder 91 and piston rod 95, is a dependent variable reacting both to the change in length of the leg 81, 85 and the restraints imposed on the platen.

Hence, when the platen is not supporting boards, no restraint is imposed on its swinging movement and retraction of piston rod 85 therefore swings the platen out and lowers it simultaneously. However, when one or more layers of boards is resting on supporting flange 101, there is a vertical force acting on the platen tending to make it move downward and a frictional force tending to resist outward pivotal movement. The resultant action of these two forces thus holds the platen in engagement with the end of the boards until the flange 101 contacts the upper surface of the new tier on chains 55 preventing further immediate downward movement of cylinder 91. Continued retraction of piston rod 85 thereupon withdraws flange 101 allowing the platen-supported tier of boards to settle gradually onto the underlying tier. The ends of the boards slide smoothly off the tapered edge of the flange without dropping abruptly.

By reason of this platen linkage geometry, the platens do not withdraw from the boards while they are elevated and allow them to drop on the underlying tier. The elevated tier is always lowered gently and not until the upper tier has found support on the under tier are the flanges 101 withdrawn. In this connection it should also be observed that the lifted boards will sag to some extent between their ends which are supported on flanges 101 and such sagging configuration further contributes to the gradual transfer of the weight of the upper tier to the underlying tier as the platens descend.

When the boards are clamped as shown in FIGURE 4, the cylinders 90 and 91 are vertical and the edges of flanges 101 on the two platens are in the vertical planes of pivots 93 and 96. The platen cylinders 80 and 81 should not incline less than 30° from horizontal when the platens are lowered and should not incline more than 60° when the platens are raised. These relationships are obtained in part by the gradual adjustment of base plate 35 as provided by crank 40, in relation to the length of the boards. For example, a common length for the studs described herein is eight feet.

When the flange 101 is completely withdrawn from between the boards, the final retracting movement of piston rod 85 then again pulls the platen down to its broken line position placing the flange 101 on a level below the under side of the bottom tier on chains 55. Then the complete cycle repeats to form a stack by adding one tier after another to the bottom thereof as shown in FIGURE 4. Each time the platens rise, the whole stack is lifted and each time the platens descend, the whole stack is lowered on top of a new tier. Also, each time the platens move together to grip a new tier, they exert a squeezing pressure to even all the ends in several of the lower tiers. For this purpose, the platens preferably have a vertical height above the flange 101 equal to several tiers of boards as shown.

As previously explained, both platens move in unison in the manner described in connection with FIGURE 4, the geometry and movements of cylinders 80 and 90 being identical with those of cylinders 81 and 91. As the stack is built up, separator sticks A are dropped on certain tiers as desired and the upward movements of the platens are sufficient to cause the under side of the bottom tier of the platen-supported stack to clear such sticks when a new tier bearing sticks is brought in on conveyor 13.

In the above-described operation of the platens in building up a stack, it will be observed that cylinder 100 in FIGURE 4 did not operate and piston rod 98 remained stationary to provide a fixed pivot point at 96 for the piston rod 95 the same as fixed pivot point 93 for piston rod 92 in FIGURE 9. Thus, if the completed stack is to be discharged straight forward from conveyor 13, cylinder 100 is not necessary and may be replaced by a rigid bracket such as the bracket 94 in FIGURE 9.

However, as the present machine is arranged, the platen 21 must be depressed in order to discharge the stack on off-bearing rolls 15 in FIGURE 1. When the stack is completed, and while piston rods 85 are retracted, cylinder 100 operates to lower bracket 97 and depress on top of platen 21 below the level of conveyor chains 55. Then, when the jump rolls 14 are raised by cylinders 66 in FIGURE 2 and both sets of rolls 14 and 15 are driven by motor 70, the stack will be discharged onto the rolls 15 over the top of the depressed platen 21. This depressing movement of platen 21 does not shift the piston rod 95 in equalizing cylinder 91 and so does not affect the platen 20.

In a similar manner, the platen depressing mechanism and off-bearing rolls 15 may be associated with platen 20 instead of platen 21 for discharge to the left when desired.

It was previously explained that the springs 57 under conveyor chains 55 would support a single tier of boards above the rollers 62 as shown in FIGURE 4. However, when the weight of several tiers of boards are imposed on chains 55, the chains depress between the plates 58 whereby most of the weight of the stack is then supported on rollers 62. When jump rolls 14 are raised and rotated to discharge the stack, the stack rolls on rollers 62 and slides on the chains 55 without excessive friction or damage to the boards.

To make a wider stack the bumper stops 22 are moved forward in FIGURE 1. These stops are carried by brackets 103 which are adjustable along conveyor side plates 58 by means 104. Brackets 103 also carry front vertical stabilizing rods 105 to stabilize the stack as it is being formed. Rear stabilizing rods 106 are mounted on brackets 45.

Several functions of the machine are controlled by the monkey 110 in FIGURES 1, 7 and 8. This is a sensing device which rides on top of the stack and travels up a vertical guide pole 111 as the stack increases in height. The monkey has a horizontal arm 112 equipped with caster wheels 113 to support it on top of the stack and permit the stack to move under it freely in off-bearing movement. The weight of the monkey is partially counterbalanced by a weight 114 connected with the monkey by a cord 115 which runs over a pulley 116.

The monkey carries three switches $S_3$, $S_{10}$ and $S_{11}$. Guide pole 111 is provided with a vertical slot 118 for the adjustment of switch actuating lugs 120 and 121. The lugs 120 extend in one direction to actuate the switch $S_{10}$ and the lugs 121 extend in the opposite direction to actuate switches $S_3$ or $S_{11}$. The functions of these switches will be described in connection with the control system diagram in FIGURES 9 and 10. When a stack is removed, the monkey descends by gravity to a lower position as shown in FIGURE 1, whereby it will be picked up by the top of the stack when a new stack is formed.

ELECTRIC CONTROL SYSTEM

In FIGURES 9 and 10, the electric, hydraulic and pneumatic systems have been combined in a single diagram, FIGURE 10 being a continuation of FIGURE 9. The five circuit wires broken off at the top of FIGURE 9 continue at the bottom of FIGURE 10.

Referring first to FIGURE 9, the electric system, shown in solid single lines, is energized from a pair of supply lines 131 and 132. The solenoid of relay 133 is energized through two normally open switches $S_2$ in series. These switches are mounted on infeed conveyor 12 in FIGURE 1 and are arranged to be closed by boards on the conveyor. Relay 133 contains normally open switch 134 and normally closed switch 135, the latter energizing a wire 136 leading directly to the upper part of the diagram in FIGURE 10. One terminal of switch 134 is connected with supply line 132 through wire 137 and normally closed safety switch $S_1$ which appears in FIGURE 4. The other terminal of switch 134 is connected through wire 138 with a normally closed switch 139 in monkey switch $S_3$. This switch unit also contains a normally open switch 140. The other terminal of switch 139 is connected through wire 141 with normally open back platen switch $S_4$ in FIGURE 1.

One terminal of switch 140 is connected through wire 142 with supply line 132 and one terminal of normally open monkey switch $S_{11}$. The other terminal of $S_{11}$ is connected through wire 143 to one terminal of solenoid 145 of a double solenoid hydraulic valve $V_3$. The other terminal of solenoid 145 is connected to supply line 131. The other solenoid 146 of valve $V_3$ is connected between supply line 131 and switch 140.

The other terminal of back platen switch $S_4$ is connected through wire 150 with one terminal of a normally open switch 151 in full tier switch $S_5$ on bracket 103 in FIGURE 1. Switch $S_5$ also contains a normally closed switch 152 having one terminal connected with supply line 131. Its other terminal is connected with a wire 153. The three normally open switches $S_6$, $S_7$ and $S_8$ are connected in parallel between wire 153 and supply line 131. $S_6$ is a back platen switch in FIGURE 1 and $S_7$ and $S_8$ are two tier lag switches shown in FIGURES 1 and 5, adjacent the chains 55 of conveyor 13.

Wire 153 connects with one terminal of relay solenoid 155, the other terminal of which is connected through a wire 156 with the other terminal of switch 151 and one terminal of relay switch 157. This relay also has normally open switches 158 and 159 connected on one side to supply line 132 and on the other side to wires 160 and 161 leading to FIGURE 10.

Referring now to FIGURE 10, wire 161 energizes the solenoid 162 of solenoid valve $V_4$, which solenoid is also connected to supply line 131. Wire 160 connects through switches $S_9$ and $S_{10}$ in series to wire 163. Switch $S_9$ is a normally open stick dropper block switch which is also a back platen switch shown in FIGURE 1. Switch $S_{10}$ is a normally open monkey switch shown in FIGURE 8. Wire 163 energizes two solenoid valves $V_1$ and $V_2$, the solenoids 164 and 165 of which are also connected to supply line 131.

Relay solenoid 166 is energized from the supply lines through normally open air stop switch $S_{14}$ in FIGURE 1, which is spaced a distance ahead of bumper stop 22. Switch $S_{14}$ energizes a wire 167. Relay switch 168 is also arranged to energize wire 167 from wire 136. Solenoid 170 of valve $V_5$ is energized from wire 167 through normally closed air stop override switch $S_{13}$. $S_{13}$ is a manual switch shown on the left end of the frame 10 in FIGURE 1 which is provided to stop stick feed when desired.

The solenoid 175 of jump roll solenoid valve $V_6$ is energized through wire 174 by normally open jump roll switch $S_{17}$ which is closed by one of the cylinders 81 in FIGURE 4 when the platen 21 is depressed for off-bearing movement of the stack. Wire 174 also has a branch connecting with wire 167. Off-bearing motor 70 is energized by relay solenoid 176 upon the closure of roller motor switch $S_{16}$ when platen 21 is depressed as described.

HYDRAULIC AND PNEUMATIC SYSTEMS

There are three hydraulic systems shown in double lines in FIGURES 9 and 10. These may be supplied from a common source of hydraulic pressure 200. In FIGURE 9, the double solenoid platen depress valve $V_3$ is shown in normal position to supply hydraulic pressure through line 201 to the lower end of cylinder 100 holding the bracket 97 raised in its normal position shown in FIGURE 4. When valve $V_3$ is energized, fluid pressure is supplied to line 202 to lower bracket 97 and depress platen 21 of off-bearing movement of the stack. The opposite ends of stabilizing cylinders 90 and 91 are cross connected through lines 203 so that these cylinders must move up and down in unison on their piston rods 92 and 95. These cylinders are connected to the source of pressure through check valves 205 to keep the cylinders filled and replenish any leakage.

In FIGURE 10, the platen lift solenoid valve $V_4$ is shown in position to supply pressure through line 210 to the rod ends of platen cylinders 80 and 81 to retract the platens. When solenoid 162 is energized, the valve shifts to its other position supplying pressure through line 211 to the head ends of the cylinders, causing the platens to clamp and lift the stack.

Jump roll cylinders 66 are normally in lower position with relief to tank through hydraulic line 68 and jump roll solenoid valve $V_6$. When this valve is energized, line 68 is connected to pressure to lift the pump rolls 14.

Two pneumatic systems are shown in broken lines in FIGURE 10. The air supplies at 300 may be a common source of air pressure. Air pressure line 301 is normally connected by stick dropper solenoid valves $V_1$ and $V_2$ to lines 302 to retract the stick droppers 48 in cylinders 50. When solenoids 164 and 165 are energized, pressure line 301 is connected to lines 303 to actuate the stick droppers.

Board stop solenoid valve $V_5$ is shown in deenergized condition to supply pressure to line 310 and retract the board stops 76 in cylinder 75. When solenoid 170 is energized, the valve shifts to its other position supplying pressure to line 311 to raise the board stops as shown in FIGURE 5.

OPERATION

With the smooth chain conveyors 12 and 13 operating continuously, boards advance on conveyor 12 closing delay control switches $S_2$ to energize relay 133. This closes relay switch 134 and opens 135 without producing any machine function. As the boards advance onto conveyor 13 they close switches $S_7$ and $S_8$ without producing any machine function.

When the boards reach switch $S_{14}$ a short distance ahead of bumper stop 22, they close this switch which energizes relay solenoid 166 and closes relay switch 168. Switch $S_{14}$ also makes a circuit through normally closed manual switch $S_{13}$ to energize solenoid 170 of valve $V_5$. This operates the board stops 76 which limit the number of boards in the first tier and hold back the oncoming boards as shown in FIGURE 5. Switch $S_{14}$ is adjustably along conveyor 13 to measure the desired width of stack.

The first tier boards continue to travel to bumper stops 22 where they actuate switch unit $S_5$. The moving chains crowd the boards tightly together. This switch actuation closes normally open switch 151 and opens normally closed switch 152. At this time the platens are retracted, holding back platen switches $S_4$, $S_6$ and $S_9$ closed. The first tier boards have passed beyond switches $S_7$ and $S_8$, allowing them to reopen as shown in FIGURE 5. Wire 150 thus being energized through the closed switches $S_4$, 139, 134 and $S_1$, a circuit is completed through wire 156, relay solenoid 155, wire 153 and the closed switch $S_6$. This closes the relay switches 157, 158 and 159 to energize wires 160 and 161. Wire 161 energizes solenoid 162 of platen valve $V_4$ to shift the valve and introduce pressure into the lower ends of platen cylinders 80 and 81. The first tier of boards is thereby lifted off conveyor 13 as shown in FIGURE 4.

Lifting movement of the platens reopens back platen switches $S_4$, $S_6$ and $S_9$ and the removal of the first tier of boards opens switch $S_{14}$ and allows switch unit $S_5$ to reopen switch 151 and reclose switch 152. Relay solenoid 155 remains energized, however, by a holding circuit through switch 152, wire 153, wire 156 and relay switch 157 whereby the first tier is held in raised position.

The opening of switch $S_{14}$ deenergizes solenoid 170 of valve $V_5$ to withdraw the board stops 76 and allow more boards to advance to form a second tier on conveyor 13. With the advance of the second tier, switches $S_7$ and $S_8$ are again closed and, when the leading board reaches switch $S_{14}$, that switch is closed to energize relay 166 and again raise the board stops 76, signalling completion of the second tier of boards.

When the boards reach switch unit $S_5$, switch 151 is closed and 152 is opened. Again, the last board in the tier has cleared the switches $S_7$ and $S_8$ as in the case of the board $B_2$ in FIGURE 5, allowing these switches to open. Since back platen switch $S_6$ is already open, the holding circuit for relay solenoid 155 is thereby opened, breaking the platen circuit through relay switch 159 and wire 161. This deenergizes the solenoid 162 of platen valve $V_4$ to shift the valve and introduce fluid pressure into the upper ends of platen cylinders 80 and 81 to retract the platen piston rods 85 and lower the platens with the first tier of boards on top of the waiting second tier.

As the platens complete their retracting movement, the platen 20 actuates back platen switches $S_4$, $S_6$ and $S_9$ which immediately reenergizes platen solenoid valve $V_4$ to lift both tiers of boards. This is accomplished by the reenergization of relay solenoid 155 by the closing of back platen switch $S_6$, switch 151 already being closed by the actuation of switch unit $S_5$ at the bumper stop. In this manner the platen cycle is repeated continuously to add one tier after another to the bottom of the stack.

Monkey switch $S_{10}$ in FIGURE 8 is a stick dropper switch. As the stack builds up, the monkey 110 rides up pole 111 on top of the stack, causing switch $S_{10}$ to be actuated from time to time by the vertically spaced lugs 120. Switch $S_{10}$ energizes the solenoids 164 and 165 of stick dropper valves $V_1$ and $V_2$, causing the plungers 48 in FIGURE 6 to eject sticks A on top of the boards on the conveyors before the boards reach stacking position. The precise timing of this function is controlled by switch $S_9$, which is a back platen switch, whereby the sticks are dropped only during intervals while the platens are retracted and the boards are stationary on the conveyors.

Monkey switch $S_{11}$ is a full stack switch which is actuated by lug 121 at the top of pole 111 in FIGURE 8. The placement of this lug determines the height of the stack. When switch $S_{11}$ is closed by lug 121, the solenoid 145 of valve $V_3$ is energized through wire 143 and switch $S_{11}$ to shift the valve and admit fluid pressure through line 202 to the top of cylinder 100 in FIGURES 4 and 9. The platens being already in retracted position, piston rod 98 is thereby extended downward to depress platen 21 below the level of conveyor 13 and off-bearing rolls 15. This depressing movement of cylinder 81 closes switches $S_{16}$ and $S_{17}$ in FIGURE 4 to raise the jump rolls 14 and start off-bearing motor 70 to drive the rolls 14 and 15 and remove the stack. During this interval, board stops 76 remain raised to hold back the oncoming boards. This is accomplished by wire 174 which maintains the energization of solenoid 170 after switch $S_{14}$ is opened by removal of the stack.

With the removal of the stack, monkey 110 drops down the pole 111, opening switch $S_{11}$ to deenergize solenoid 145 of valve $V_3$. Then the monkey produces actuation of switch unit $S_3$ by a lug similar to lug 121 near the bottom of the pole. Actuation of switch unit $S_3$ opens switch 139 and closes switch 140, the latter energizing solenoid 146 to shift valve $V_3$ back to its normal position and raise platen 21 from its depressed position to its normal retracted position. This movement of cylinder 81 opens switches $S_{16}$ and $S_{17}$ to stop the off-bearing drive motor 70 and lower the jump rolls 14. The opening of switch 139 performs no function since switch 151 is already open.

A new stacking cycle is initiated by opening the normally closed manual push button switch $S_{13}$ in FIGURE 1. Switch $S_{17}$ now being open, this deenergizes the solenoid 170 of board stop valve $V_5$, retracting the board stop 76 and allowing another measured group of boards to move forward to form a bottom tier for a new stack.

When the board supply is exhausted, the last energization of board stop valve solenoid 170 is maintained by wire 136 to hold the board stops 76 raised. This is accomplished by the opening of switches $S_2$ which deenergize relay 133 to close relay switch 135 and make a holding circuit through wire 136 and relay switch 168 to wire 167.

Switch $S_1$ in FIGURE 4 is a safety switch which does not normally function. In case of a fault in the system which might cause the platen cylinders 80 and 81 to operate without boards between the platens, the cylinder 91 would tilt counterclockwise and open this switch. This would provide positive means for opening the circuit not only for platen relay solenoid 155 but also for platen valve solenoid 162 by deenergizing wires 180 and 161.

Having now described my invention and in what manner the same may be used, what I claim as new and desire to protect by Letters Patent is:

1. In a stacking machine, a pair of opposed, upwardly inclined cylinders mounted on horizontal pivots, piston rods in the upper ends of said cylinders, a pair of platens pivotally mounted on said piston rods, said platens having confronting vertical gripping faces and wedge-shaped horizontal bottom flanges, an upright cylinder and piston rod unit fixedly mounted at its upper end on the bottom of each platen, a pivotal support for the lower end of each of said units in vertical alignment with the edge of the platen flange, and hydraulic conduits cross connected between opposite ends of the cylinders of said units to maintain the two platens on a level with each other.

2. In a stacking machine as defined in claim 1, means to lower one of said pivotal supports to depress one of said platens below its normal operating position.

3. In a stacking machine as defined in claim 2, an infeed conveyor arranged to move articles to be stacked between said platens, and an off-bearing conveyor behind said depressible platen for discharging a completed stack.

4. In a stacking machine as defined in claim 3, off-bearing jump rolls between said platens arranged to move said stack over said depressed platen to said off-bearing conveyor.

5. In a stacking machine as defined in claim 4, control means bearing on the top of the stack arranged to depress said depressible platen and raise said jump rolls.

6. In a stacking machine, a pair of lifting platens arranged and operated to build a stack of objects from the bottom of the stack, means for depressing one of said platens for off-bearing movement of the stack over the depressed platen, and off-bearing conveyor behind said depressible platen, off-bearing jump rolls between said platens, infeed conveyor chains between said platens above the level of said jump rolls when the latter are in lower position, and means for lowering said chains under a stack for off-bearing movement of the stack on said jump rolls and off-bearing conveyor.

7. A stacking machine as defined in claim 6, said means for lowering said chains comprising resilient supporting means capable of supporting a single tier of objects but yieldable under the weight of a plurality of tiers.

8. A stacking machine as defined in claim 7, said resilient supporting means comprising pre-loaded springs which are not deflected by the weight of said single tier.

9. In a stacking machine as defined in claim 6, a supporting plate, a spring on said plate, a chain guide track supported by said spring, a conveyor chain of said infeed conveyor on said guide track, a semi-cylindrical groove in the top edge of said plate extending alongside said chain, and a roller in said groove slightly below the top supporting surface of said chain, said roller being in said off-bearing conveyor.

10. In a lumber stacking machine, an infeed conveyor arranged to feed tiers of boards in edgewise movement, opposed upwardly inclined cylinders pivotally mounted on opposite sides of said conveyor, a pair of confronting platens operable by said cylinders to grip the ends of boards in a tier on said conveyor, lift the tier while said conveyor moves a new tier between the platens, lower the lifted tier on the new tier, grip the new tier and lift both tiers, in repeated cycles to build a stack of boards from the bottom of the stack, off-bearing means for said stack, and means for depressing one of said platens below said off-bearing means, said off-bearing means being arranged to remove a stack over the depressed platen.

11. In a stacking machine, an article support, a pair of extensible squeezing and lifting members having lower ends pivotally mounted on opposite sides of said support below the level of said support, a pair of L-shaped platens pivotally mounted on the extensible upper ends of said members, each platen having a horizontal lifting flange and a vertical squeezing flange, both of said flanges being at said upper end of its associated extensible member, said upper ends of said members being inclined toward said support in opposed relation to engage opposite ends of an article on said support and lift the article when said members are extended, so that another article may be moved thereunder on said support to build a stack from the bottom.

12. In a stacking machine as defined in claim 11, said extensible member comprising cylinder and piston units.

13. In a stacking machine as defined in claim 11, said article support comprising an infeed conveyor.

14. In a stacking machine as defined in claim 13, an off-bearing conveyor for the stacks of articles.

15. In a stacking machine as defined in claim 14, said off-bearing conveyor running at right angles to said infeed conveyor, and means to depress one of said platens below said off-bearing conveyor.

16. In a stacking machine as defined in claim 14, means responsive to the height of the stack for stopping the operation of said extensible members and starting said off-bearing conveyor.

17. In a stacking machine as defined in claim 16, said responsive means comprising a pole adjacent the position of the stack, a control device arranged to rest on top of the stack and travel up said pole as said articles are stacked, and means on said pole for actuating said control device.

18. In a stacking machine as defined in claim 16, means for placing separator sticks on articles on said infeed conveyor, and means actuated by said height responsive means for operating said stick placing means.

19. In a stacking machine as defined in claim 11, means to adjust said extensible members toward and away from each other for stacking articles of different length.

20. A machine for building a stack of lumber from the bottom comprising an infeed conveyor arranged to feed tiers of boards in edgewise movement with the ends of the boards overhanging said conveyor, cylinders on opposite sides of said conveyor having lower ends pivotally mounted below the level of said conveyor, piston rods in the upper ends of said cylinders, and L-shaped platens mounted on said piston rods, said platens having horizontal lifting flanges and vertical squeezing flanges, said piston rods being pivotally connected to said platens at points adjacent the lower edges of said vertical flanges, said pivotal mountings for said cylinders being spaced outward from the opposite ends of said boards so that said cylinders are inclined toward each other in opposing relation when said platens engage a tier of boards on said conveyor, extension of said piston rods causing said tier to be lifted so that said conveyor may feed a new tier of boards thereunder, subsequent retraction and extension of said piston rods causing said platens to lower the first tier on top of said new tier and then engage the new tier and lift both tiers whereby in repeated cycles of said piston rods and conveyor a stack of tiers is built.

21. A machine as defined in claim 20 including off-bearing means to remove a completed stack, means responsive to the height of the stack for operating said off-bearing means, means for adjusting said responsive means to vary the height of the stack, means to adjust said platens toward and away from said conveyor for stacking boards of different length, and means to vary the width of said tiers to change the width of the stack.

22. A machine as defined in claim 20 including a board stop ahead of said platens arranged to stop oncoming boards on said conveyor when a tier width of boards has passed the stop, a bumper stop for stopping said tier width of boards between said platens, and a control device between said board stop and bumper stop arranged for actuation by the leading board of the tier to measure said tier width of boards and operate said board stop.

23. In a machine as defined in claim 22, stick droppers arranged to drop tier separator sticks on the boards behind said board stops while said boards are held stationary by said stops.

24. A machine as defined in claim 20, said conveyor comprising a pair of continuously moving smooth infeed conveyor chains arranged to support end portions of boards and feed the boards in said edgewise movement into a stacking station between said platens, a pair of vertically movable board stops retractable below the level of said chains and extendable above said chains a distance less than the thickness of the boards, abutments a distance above said stops slightly exceeding the thickness of the boards when the stops are raised and less than twice the thickness of the boards above said chains so that when said stops are raised under a board the raised board will not be displaced from the layer of boards on the chains and will not be clamped against said abutments, said stops in raised position aligning the oncoming boards transversely of the chains by the crowding action of the chains, and a control device forward from said stops arranged for actuation by the leading board of a tier width of boards to measure said tier width and raise said stops allowing said tier width of boards to be carried into said stacking station.

25. A machine as defined in claim 20 including a pole adjacent the stacked tiers, a member arranged to rest on top of the stack and travel up said pole as said tiers are stacked, a control device on said member arranged to control a function of the machine, and means on said pole for actuating said control drive.

26. In a machine as defined in claim 25, off-bearing means for the stack, and means responsive to said control device for stopping said stacking platens and operating said off-bearing means.

27. In a machine as defined in claim 25, tier separator stick droppers associated with said infeed conveyor and means responsive to said control device for operating said stick droppers.

References Cited

UNITED STATES PATENTS

| | | | |
|---|---|---|---|
| 2,028,410 | 1/1936 | Rapisarda | 214—6 |
| 2,550,587 | 4/1951 | Neja | 214—6 |
| 2,968,490 | 1/1961 | Baus | 214—390 |
| 2,997,187 | 8/1961 | Burt | 214—6 |
| 3,019,926 | 2/1962 | Christenson | 214—392 |
| 3,037,645 | 6/1962 | Simpkins | 214—6 |
| 3,039,624 | 6/1962 | Campbell | 214—6 |
| 3,092,266 | 6/1963 | De Koning | 214—6 |

ALBERT J. MAKAY, *Primary Examiner.*

J. E. OLDS, *Assistant Examiner.*

GERALD M. FORLENZA, *Examiner.*